(12) United States Patent
Danko et al.

(10) Patent No.: US 11,867,339 B2
(45) Date of Patent: Jan. 9, 2024

(54) MOTORIZED APPARATUS INCLUDING WHEELS

(71) Applicant: General Electric Company, Schenectady, NY (US)

(72) Inventors: Todd William Danko, Niskayuna, NY (US); Alexander Kyle Duncan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/590,628

(22) Filed: Feb. 1, 2022

(65) Prior Publication Data

US 2023/0243456 A1 Aug. 3, 2023

(51) Int. Cl.
*F16L 55/18* (2006.01)
*F16L 55/32* (2006.01)
*F16L 101/30* (2006.01)

(52) U.S. Cl.
CPC .............. *F16L 55/18* (2013.01); *F16L 55/32* (2013.01); *F16L 2101/30* (2013.01)

(58) Field of Classification Search
CPC .... B60B 19/00; B25J 5/00; B25J 19/00; B25J 9/18; F16L 55/32; F16L 55/18
USPC ............... 138/97; 73/865.8, 623; 318/568.11
See application file for complete search history.

(56) References Cited

U.S. PATENT DOCUMENTS

| | | | | | |
|---|---|---|---|---|---|
| 5,454,276 | A | * | 10/1995 | Wernicke | G01N 27/9013 73/866.5 |
| 5,565,633 | A | * | 10/1996 | Wernicke | G01N 27/82 73/865.8 |
| 6,100,684 | A | * | 8/2000 | Ramaut | G01N 27/82 324/228 |

(Continued)

FOREIGN PATENT DOCUMENTS

CN 104552236 B 11/2016
CN 207548729 U 6/2018
(Continued)

OTHER PUBLICATIONS

"Jude Amila Mihiranga Robise", "Development and Navigation of a Hybrid Omni-mecanum Wheel Robot Platform", Asian Institute of Technology School of Engineering and Technology, p. 93, Location: Thailand, May 2019.

*Primary Examiner* — Patrick F Brinson
(74) *Attorney, Agent, or Firm* — Armstrong Teasdale LLP

(57) ABSTRACT

A motorized apparatus for use in maintaining a pipe having a sidewall defining an interior cavity is provided. The motorized apparatus includes a body assembly extending along a longitudinal axis, at least one maintenance device coupled to the body assembly, and a plurality of leg assemblies coupled circumferentially around the body assembly. The motorized apparatus also includes a plurality of drive mechanisms coupled to the plurality of leg assemblies. The plurality of drive mechanisms are configured to interact with the sidewall. The plurality of drive mechanisms include at least two wheels. The plurality of drive mechanisms are (Continued)

arranged to move the body assembly in a first direction parallel to the longitudinal axis, move the body assembly in a second direction perpendicular to the longitudinal axis, and rotate the body assembly around the longitudinal axis.

20 Claims, 8 Drawing Sheets

(56) References Cited

U.S. PATENT DOCUMENTS

| | | | | |
|---|---|---|---|---|
| 8,146,449 | B2* | 4/2012 | Rosen | G01N 29/265 |
| | | | | 73/865.8 |
| 11,085,885 | B2* | 8/2021 | Sanchez | B05D 3/002 |
| 2002/0190682 | A1* | 12/2002 | Schempf | G01N 29/265 |
| | | | | 318/568.11 |
| 2014/0189968 | A1* | 7/2014 | Kim | B08B 9/049 |
| | | | | 15/88 |
| 2018/0229404 | A1* | 8/2018 | Starr | B29C 73/10 |
| 2020/0023915 | A1 | 1/2020 | Danko | |
| 2021/0025533 | A1 | 1/2021 | Duncan et al. | |
| 2021/0025534 | A1 | 1/2021 | Duncan et al. | |
| 2021/0025535 | A1 | 1/2021 | Duncan et al. | |
| 2021/0025536 | A1 | 1/2021 | Duncan et al. | |

FOREIGN PATENT DOCUMENTS

| | | |
|---|---|---|
| CN | 208484479 U | 2/2019 |
| CN | 210605455 U | 5/2020 |
| CN | 111377006 A | 7/2020 |
| KR | 101304721 B1 | 9/2013 |
| KR | 102083366 B1 | 3/2020 |

* cited by examiner

MOTORIZED APPARATUS INCLUDING WHEELS

BACKGROUND

The field of the disclosure relates to motorized apparatus, and more particularly to motorized apparatus including at least two wheels and configured to travel through an interior cavity of pipes and perform a maintenance operation within the pipes.

Pipes are commonly used to transport fluids. For example, typical pipes include a cylindrical sidewall that defines an interior cavity. During operation, fluids are transported within the interior cavity of the pipes. Sometimes, the fluids that are transported through the pipes have characteristics that can cause wear, deterioration, or otherwise affect the properties of the pipes. As a result, the pipes may require routine inspection and repair. However, the interior cavity of the pipes may be difficult to access for routine maintenance. For example, at least some known pipes are used to transport fluids having high temperatures, pressures, and/or other properties that create conditions which are inhospitable for at least some known maintenance apparatus. Moreover, at least some known pipes are difficult for at least some known apparatus to travel through because of the pipes' size and shape and obstacles within the interior cavity.

Accordingly, it is desirable to provide a system including a motorized apparatus configured to travel through an interior cavity of the pipes and avoid obstacles within the pipes.

BRIEF DESCRIPTION

In one aspect, a motorized apparatus for use in maintaining a pipe having a sidewall defining an interior cavity is provided. The motorized apparatus includes a body assembly extending along a longitudinal axis, at least one maintenance device coupled to the body assembly, and a plurality of leg assemblies coupled circumferentially around the body assembly. The motorized apparatus also includes a plurality of drive mechanisms coupled to the plurality of leg assemblies. The plurality of drive mechanisms are configured to interact with the sidewall. The plurality of drive mechanisms include at least two wheels. The plurality of drive mechanisms are arranged to move the body assembly in a first direction parallel to the longitudinal axis, move the body assembly in a second direction perpendicular to the longitudinal axis, and rotate the body assembly around the longitudinal axis.

In another aspect, a system for use in maintaining a pipe having a sidewall defining an interior cavity is provided. The system includes a motorized apparatus sized to fit within the interior cavity and configured to travel along the pipe through the interior cavity. The motorized apparatus includes a body assembly extending along a longitudinal axis, at least one maintenance device coupled to the body assembly, a plurality of leg assemblies coupled circumferentially around the body assembly, and a plurality of drive mechanisms coupled to the plurality of leg assemblies. The plurality of drive mechanisms are configured to interact with the sidewall. The plurality of drive mechanisms includes at least two wheels. The system also includes a controller communicatively coupled to the motorized apparatus. The controller is configured to send instructions to the motorized apparatus to operate the plurality of drive mechanisms and the at least one maintenance device. The plurality of drive mechanisms are arranged to move the body assembly in a first direction parallel to the longitudinal axis, move the body assembly in a second direction perpendicular to the longitudinal axis, and rotate the body assembly around the longitudinal axis.

In yet another aspect, a method for method for maintaining a pipe having a sidewall defining an interior cavity is provided. The method includes positioning a motorized apparatus within the interior cavity. The motorized apparatus includes a body assembly extending along a longitudinal axis, at least one maintenance device coupled to the body assembly, a plurality of leg assemblies coupled circumferentially around the body assembly; and a plurality of drive mechanisms coupled to the plurality of leg assemblies. The plurality of drive mechanisms are configured to interact with the sidewall. The plurality of drive mechanisms include at least two wheels. The method also includes sending instructions to the motorized apparatus to operate the plurality of drive mechanisms, and moving the motorized apparatus through the interior cavity using the plurality of drive mechanisms. The plurality of drive mechanisms are arranged to move the body assembly in a first direction parallel to the longitudinal axis, move the body assembly in a second direction perpendicular to the longitudinal axis, and rotate the body assembly around the longitudinal axis.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
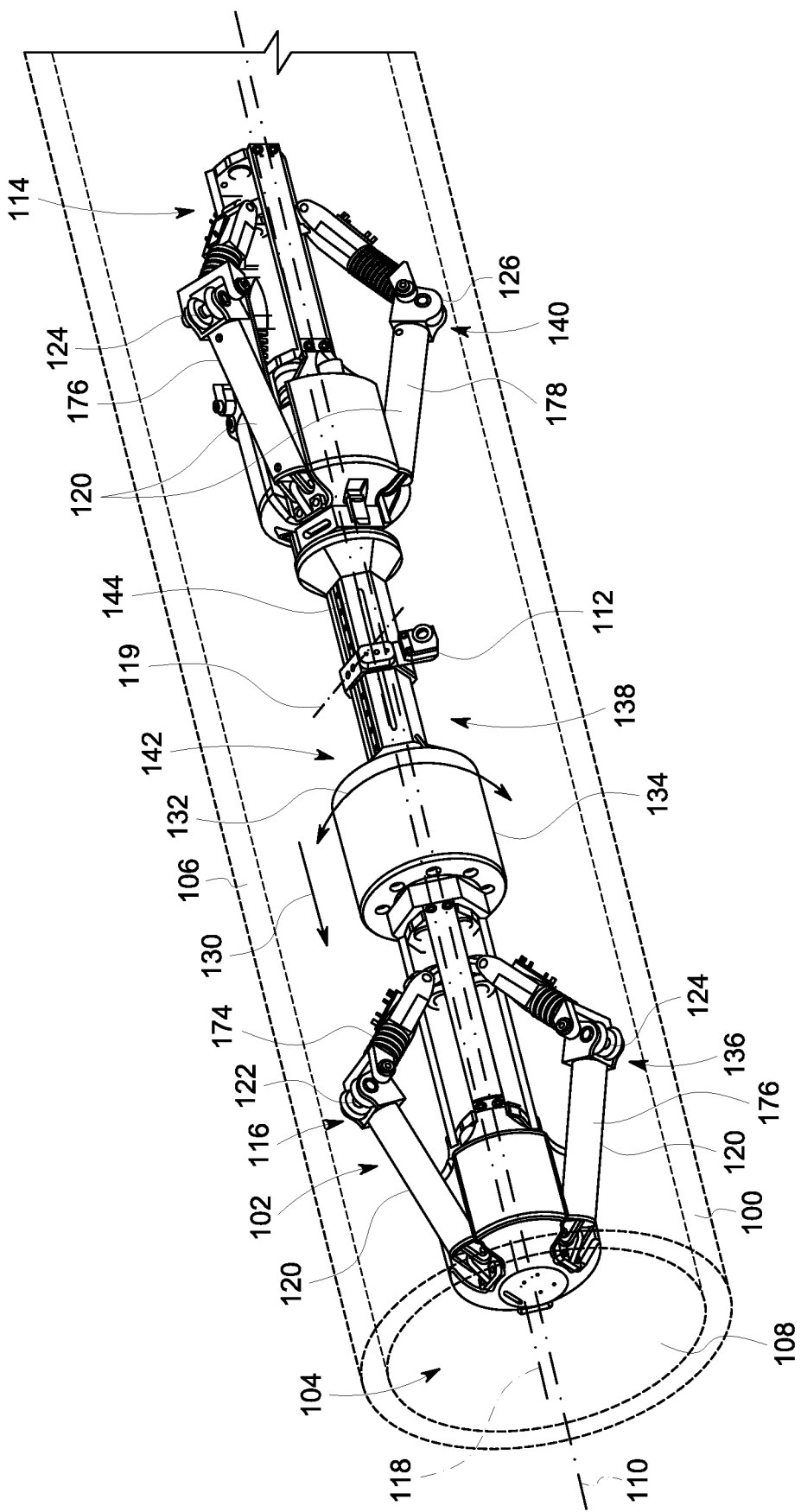
FIG. 1 is a perspective view of a portion of a pipe with a motorized apparatus traveling through an interior cavity of the pipe.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a system for inspecting and/or repairing pipes. The system includes multi-legged independently actuated motorized apparatus for delivering inspection and repair tools to difficult to access locations within piping networks. Mechanical separation and independent control of each leg enables an operator to control a radial position and axial pitch of the motorized apparatus within a pipe. In addition, the motorized apparatus includes drive mechanisms that facilitate movement of the motorized in multiple directions and enable the motorized apparatus to rotate around a longitudinal axis of the motorized apparatus. For example, the drive mechanisms include at least two mecanum wheels and at least one omni-wheel. As a result, the motorized apparatus has at least six degrees of freedom. The independently actuated, antagonistically positioned legs maintain contact with a pipe wall allowing the motorized apparatus to tilt, shift, and rotate relative to an axis of the pipe. As a result, the apparatus is able to traverse obstacles including curves, reducers (concentric and eccentric), and vertical segments.

FIG. 1 is a perspective view of a portion of a pipe 100 with a motorized apparatus 102 traveling through an interior cavity 104 of pipe 100. In the example embodiment, pipe 100 includes a sidewall 106 having an interior surface 108 extending around a central axis 110 and defining interior cavity 104. Pipe 100 is cylindrical and has a diameter in a range of about 6 inches to about 36 inches or about 12 inches to about 36 inches. In some embodiments, pipe 100 has a length of at least 500 feet. In alternative embodiments, pipe 100 may be any shape and/or size.

Also, in the example embodiment, motorized apparatus 102 is configured to travel through interior cavity 104 of pipe 100 along a length of pipe 100. For example, in some embodiments, motorized apparatus 102 is configured to fit within interior cavity 104 and travel up to 500 feet along the length of pipe 100. Accordingly, motorized apparatus 102 facilitates inspection and repair of pipe 100 within interior cavity 104 at locations that are inaccessible from an exterior of pipe 100. Moreover, motorized apparatus 102 is self-propelled, meaning that motorized apparatus 102 moves within interior cavity 104 without an external force acting on motorized apparatus 102.

During operation, motorized apparatus 102 enters interior cavity 104 of pipe 100 from an opening or access hatch. Motorized apparatus 102 travels in a travel direction 130. In some embodiments, motorized apparatus 102 traverses transitions in pipe 100 such as bends or size transitions. When motorized apparatus 102 reaches a target location, motorized apparatus 102 goes into a parked mode and a maintenance device 112 of motorized apparatus 102 is positioned relative to motorized apparatus 102 to perform a maintenance and/or repair operation.

As motorized apparatus 102 travels through interior cavity 104, motorized apparatus 102 is used to inspect and/or repair any interior components of pipe 100. For example, in some embodiments, motorized apparatus 102 is used to generate an image of interior surface 108 and the image is examined to determine whether repairs are necessary. If repairs are necessary, motorized apparatus 102 can be used to repair interior surface 108. For example, in some embodiments, motorized apparatus 102 patches a portion of interior surface 108. Interior surface 108 may be any surface within interior cavity 104 of pipe 100.

Motorized apparatus 102 includes a body assembly 114 and at least one drive system 116. Body assembly 114 of motorized apparatus 102 is sized to fit within interior cavity 104 and includes a longitudinal axis 118. Each drive system 116 is coupled to a leg assembly 120 and is configured to move body assembly 114 relative to pipe 100. For example, each drive system 116 includes a plurality of drive mechanisms such as a first wheel 122, a second wheel 124, and a third wheel 126, and a motor 128 (shown in FIG. 6) drivingly coupled to at least first wheel 122 and second wheel 124. A power source, such as a battery, provides power for operation of motor 128. In some embodiments, power is provided via a tether. During operation, motor 128 causes rotation of first wheel 122 and second wheel 124 in one or more selected directions to propel motorized apparatus 102. Motorized apparatus 102 moves along surface 108 as wheels 122 interact with surface 108.

In the example embodiment, first wheel 122 and second wheel 124 are mecanum wheels and third wheel 126 (shown in FIG. 5) is an omni-wheel. As a result, motorized apparatus 102 is configured to move in at least six directions. For example, the drive mechanisms of drive system 116 are arranged to move body assembly 114 in a first direction parallel to longitudinal axis 118, move body assembly 114 in a second direction perpendicular to longitudinal axis 118, and rotate body assembly 114 around longitudinal axis 118. In alternative embodiments, motorized apparatus 102 includes any drive system 116 that enables motorized apparatus 102 to operate as described. For example, in some embodiments, drive system 116 includes a drive mechanism other than wheels 122, 124, 126, such as treads, tracks, worms, legs, and/or electromagnetic or fluidic locomotion mechanisms.

In the example embodiment, maintenance device 112 is coupled to body assembly 114. In some embodiments, maintenance device 112 is movable relative to body assembly 114. For example, maintenance device 112 can move translationally in travel direction 130 along body assembly 114 as well as rotate in rotation direction 132 about body assembly 114, offering maintenance device 112 a field of regard covering interior cavity 104 of pipe 100. A maintenance device actuator 134 is coupled to body assembly 114 and maintenance device 112, and is operable to move maintenance device 112 translationally along body assembly 114 and to rotate maintenance device 112 around body assembly 114.

Maintenance device 112 includes any device that enables maintenance device 112 to operate as described herein. For example, in some embodiments, maintenance device 112 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, maintenance device 112 is used to provide information for steering motorized apparatus 102 and/or to perform a maintenance operation.

In addition, in some embodiments, motorized apparatus 102 includes a light source (not shown) configured to illuminate at least a portion of interior cavity 104 to facilitate steering of motorized apparatus 102 and/or to allow maintenance device 112 to capture images. The light source may be coupled to body assembly 114 and, in some embodiments, may be positionable relative to body assembly 114. In alternative embodiments, motorized apparatus 102 includes any light source that enables motorized apparatus 102 to operate as described herein.

Also, in the example embodiment, body assembly 114 is modular and includes a plurality of portions that are detachably coupled together. Specifically, body assembly 114 includes a first drive portion 136, a maintenance device portion 138, and a second drive portion 140. In alternative embodiments, body assembly 114 includes any portions that enable motorized apparatus 102 to operate as described herein.

In the example embodiment, first drive portion 136 and second drive portion 140 are coupled to opposite ends of maintenance device portion 138. Maintenance device portion 138 includes a maintenance body 142. Maintenance body 142 forms a portion of body assembly 114 when maintenance device portion 138 is coupled to at least one other portion 136, 138, 140. Maintenance body 142 includes an axial track 144 for maintenance device 112 to move along. In alternative embodiments, maintenance device portion 138 includes any maintenance body 142 that enables motorized apparatus 102 to operate as described herein.

Figure 2:
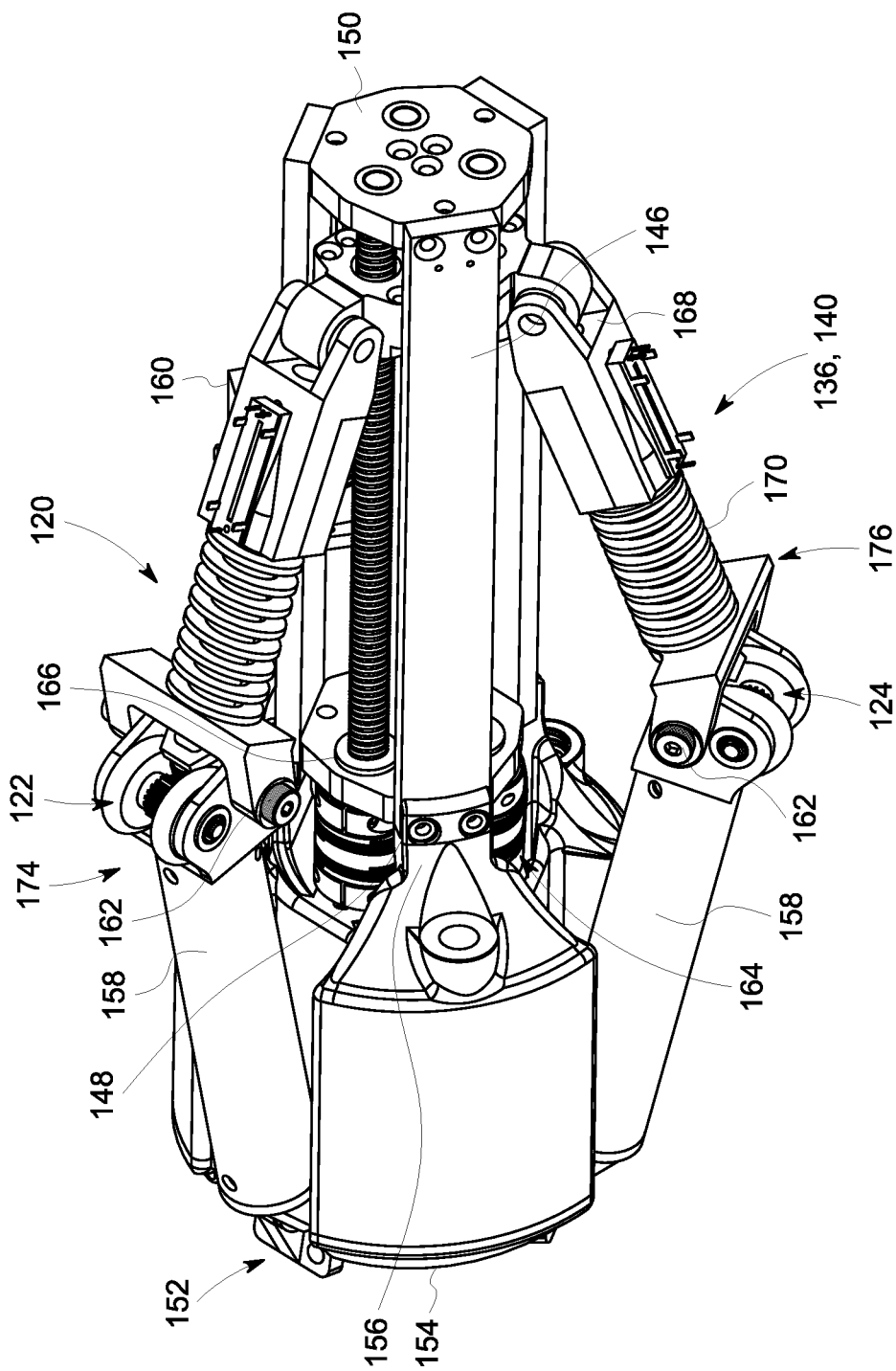
FIG. 2 is a perspective view of a portion of the motorized apparatus shown in FIG. 1.

FIG. 2 is a perspective view of drive portions 136, 140 of motorized apparatus 102. In the example embodiment, drive portions 136, 140 are identical and are able to couple to either end of maintenance device portion 138 (shown in FIG. 1) and/or to each other. Accordingly, drive portions 136, 140 are interchangeable and are able to be removed and, if necessary, replaced.

Also, in the example embodiment, each drive portion 136, 140 includes a support 146 including a support first end 148 and support second end 150, and a housing 152 including a housing first end 154 and a housing second end 156. Support first end 148 is coupled to housing second end 156.

Moreover, in the example embodiment, each drive portion 136, 140 includes a plurality of leg assemblies 120. Leg assemblies 120 each include a first leg portion 158 rotatably coupled to housing 152, and a second leg portion 160 moveably coupled to second end 150 of support 146. First leg portion 158 and second leg portion 160 are rotatably coupled together at joint 162. Leg assemblies 120 are positioned circumferentially around support 146.

In the example embodiment, motorized apparatus 102 includes at least three leg assemblies 120 coupled to each drive portion 136, 140. Each leg assembly 120 is independently actuated and antagonistically positioned to maintain a constant contact force against the sidewall 106. Motorized apparatus 102 is able to tilt and shift relative to the axis of pipe 100 by controlling the position of leg assemblies 120. In alternative embodiments, motorized apparatus 102 includes any leg assemblies 120 that enable motorized apparatus 102 to operate as described herein.

In addition, in the example embodiment, each drive portion 136, 140 includes at least one actuator assembly 164 configured to independently position second leg portions 160 of leg assemblies 120 relative to support 146. In the example embodiment, each leg assembly 120 is positioned relative to support 146 by rotating a screw drive 166 engaged with the respective second leg portion 160. In the example embodiment, actuator assembly 164 is housed in housing 152. In alternative embodiments, drive portion 136, 140 includes any actuator assembly 164 that enables motorized apparatus 102 to operate as described herein.

Moreover, in the example embodiment, second leg portion 160 includes a telescoping portion 168 and a bias member 170. In the example embodiment, bias member 170 is a spring. In other embodiments, bias member 170 may be another device able to store potential energy. Devices able to store potential energy may incorporate a piston, a plunger, or one or more magnets. Telescoping portion 168 is rotatably coupled to first leg portion 158 of leg assembly 120 at joint 162. In the example embodiment, an elongate portion of telescoping portion 168 is housed within bias member 170 and an outer portion of telescoping portion 168 is positioned adjacent bias member 170 and slidably receives the elongate portion within an interior cavity. Bias member 170 exerts a force against telescoping portion 168 in a direction substantially away from second end 150 of support 146. The force of bias member 170 against telescoping portion 168 biases leg assemblies 120 in a radially outward position. In alternative embodiments, second leg portion 160 is configured to move in any manner that enables leg assemblies 120 to function as described herein.

Moreover, in the example embodiment, each leg assembly 120 includes joint 162 rotatably coupling first leg portion 158 to second leg portion 160. For example, joints 162 include pins and bearings that engage the ends of first leg portions 158 and second leg portions 160 opposite body assembly 114. Joints 162 define an outermost radius of motorized apparatus 102. Moreover, joints 162 are configured to move radially relative to longitudinal axis 118 of motorized apparatus 102 when leg assemblies 120 are actuated. In alternative embodiments, leg assemblies 120 include any joints that enable motorized apparatus 102 to operate as described herein.

Referring to FIGS. 1 and 2, drive portions 136, 140 include drive systems 116 configured to propel motorized apparatus 102 through interior cavity 104 of pipe 100. For example, drive mechanisms such as wheels 122, 124, 126 on each drive portion 136, 140 interact with sidewall 106 and are driven by one or more motors to propel motorized apparatus 102 along pipe 100. In the example embodiment, wheels 122, 124, 126 are coupled to joints 162 of leg assemblies 120. In the example embodiment, wheels 122, 124, 126 are arranged to facilitate driving of motorized apparatus 102 in multiple directions. For example, drive systems 116 are arranged such that first and second wheels 122, 124 interact with sidewall 106 to propel motorized apparatus 102 in a selected direction. Third wheels 126 pivot to a corresponding position when first and second wheels are driven such that third wheels 126 facilitate movement of motorized apparatus 102 in the selected direction. In alternative embodiment, drive systems 116 include any wheels 122, 124, 126 that enable motorized apparatus 102 to operate as described herein.

In addition, in the example embodiment, leg assemblies 120 are arranged in sets of three (a first leg assembly 174, a second leg assembly 176, and a third leg assembly 178) and the sets are circumferentially spaced about longitudinal axis 118 on each drive portion 136, 140. Also, each drive portion 136, 140 includes first wheel 122 coupled to first leg assembly 174, second wheel 124 coupled to second leg assembly 176, and third wheel 126 coupled to third leg assembly 178. Accordingly, in the example embodiment, motorized apparatus 102 cumulatively includes four mecanum wheels and two omni-wheels (each set on each drive portion 136, 140 includes one omni-wheel and two mecanum wheels).

Also, in the example embodiment, leg assemblies 120 are positionable relative to body assembly 114 and facilitate motorized apparatus 102 traversing different transitions of pipe 100 (e.g., pipe size changes and bends). For example, leg assemblies 120 are positionable to support motorized apparatus 102 in a portion of pipe 100 having a reduced diameter by moving joints 162 of leg assemblies 120 closer to body assembly 114 using actuator assembly 164. In addition, leg assemblies 120 are able to adjust the radial position and/or orientation of body assembly 114 relative to a central axis of pipe 100. Moreover, motorized apparatus 102 is able to traverse non-concentric transitions because leg assemblies 120 are positionable and configured to traverse different transitions.

Figure 3:
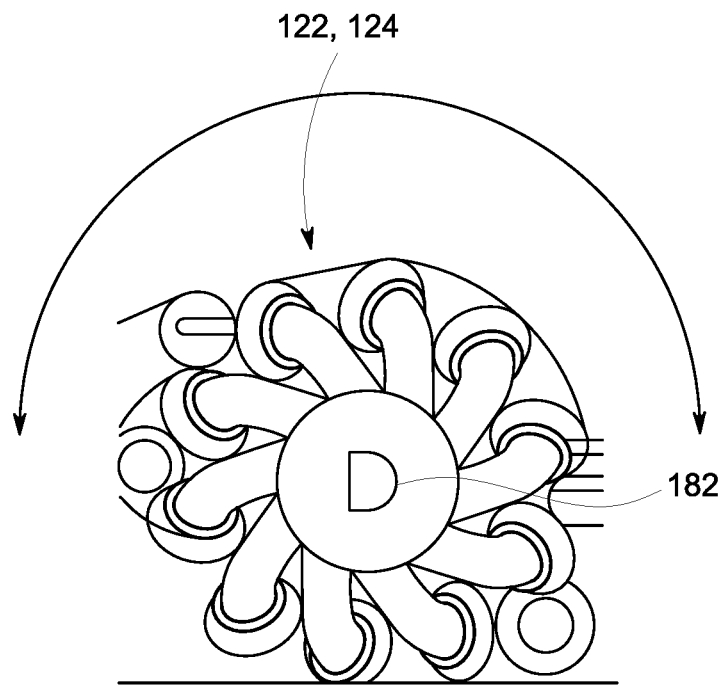
FIG. 3 is a side view of a mecanum wheel for use with the motorized apparatus shown in FIGS. 1 and 2.
Figure 4:
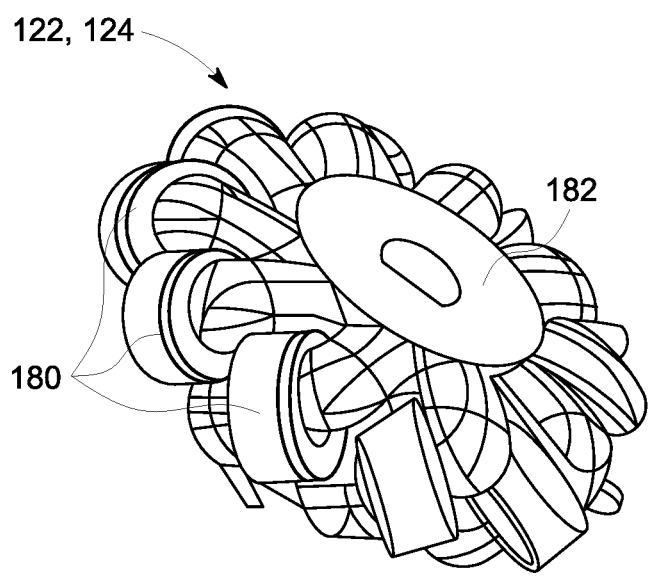
FIG. 4 is a perspective view of the mecanum wheel shown in FIG. 3.

FIG. 3 is a side view of example wheels 122, 124 for use with motorized apparatus 102 (shown in FIGS. 1 and 2). FIG. 4 is a perspective view of wheels 122, 124. In the example embodiment, wheels 122, 124 are mecanum wheels and include a plurality of passively controlled components 180 (e.g., rollers) attached to a hub 182. Passively controlled components 180 extend at an oblique angle to an axis through hub 182 and are configured to passively rotate when wheels 122, 124 engage a surface and hub 182 is rotated relative to the surface. Wheels 122, 124 are transitionable between a plurality of positions. Accordingly, wheels 122 allow motorized apparatus 102 to move in a plurality of different directions and provide increased control of movement of motorized apparatus 102. For example, motorized apparatus 102 (shown in FIG. 1) is able to move in directions parallel to longitudinal axis 118 (shown in FIG. 1), perpendicular to longitudinal axis 118, parallel to a transverse axis 119 (shown in FIG. 1), and perpendicular to transverse axis 119. In addition, motorized apparatus 102 is able to rotate around longitudinal axis 118 within pipe 100.

Figure 5:
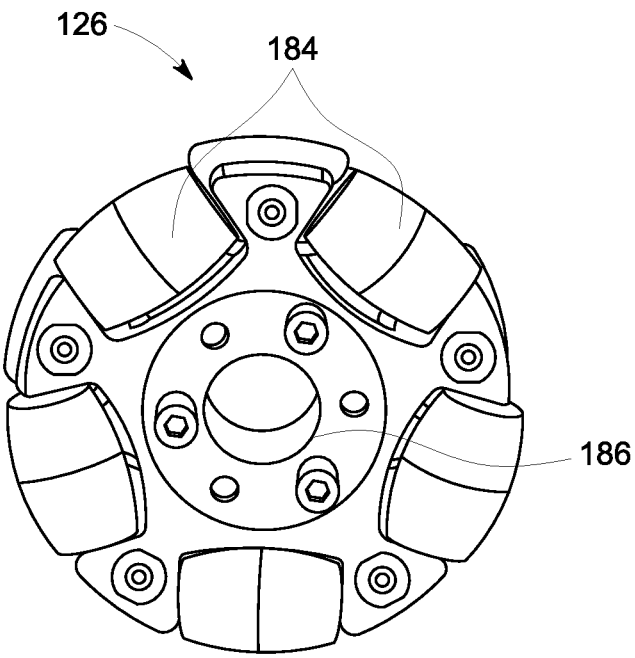
FIG. 5 is a side view of an omni-wheel for use with the motorized apparatus shown in FIGS. 1 and 2.

FIG. 5 is a side view of an example wheel 126 for use with motorized apparatus 102 (shown in FIGS. 1 and 2). In the example embodiment, wheel 126 is an omni-wheel and is passively controlled (e.g., wheel 126 is not connected to a motor and is free to move in any direction). Wheel 126 includes a plurality of passively controlled components 184 (e.g., rollers) attached to a hub 186. Passively controlled components 184 extend around the circumference of wheel 126 and are perpendicular to an axis through hub 186. The omni-wheel is different form a mecanum wheel because the omni-wheel because components 184 are perpendicular to the rotation axis. In contrast, components 180 are positioned at angles to the rotation axis. In the example embodiment, wheel 126 facilitates motorized apparatus 102 moving in any direction and facilitates quick changes in direction by motorized apparatus 102. In alternative embodiments, motorized apparatus includes any wheels 122, 124, 126 that enable motorized apparatus 102 to operate as described herein. In some embodiments, at least one of wheels 122, 124, 126 is attached to one or more pivot or rotating joints that facilitate wheels 122, 124, 126 moving in any direction.

Figure 6:
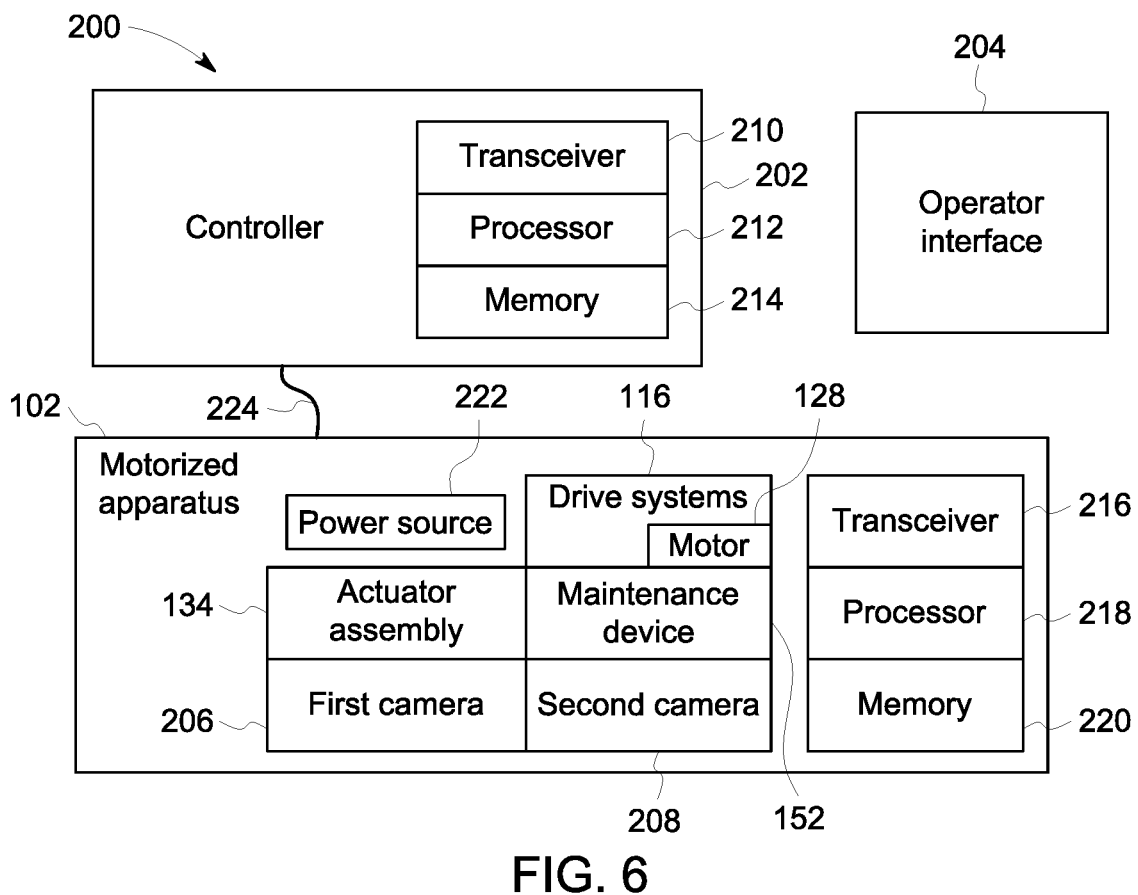
FIG. 6 is a block diagram of a system for use in maintaining the pipe shown in FIG. 1.

FIG. 6 is a block diagram of a system 200 for use in maintaining pipe 100 (shown in FIG. 1). System 200 includes motorized apparatus 102, a controller 202, and an operator interface 204. Motorized apparatus 102 includes maintenance device 112, at least one camera 206, 208, and drive systems 116. In alternative embodiments, system 200 includes any component that enables system 200 to operate as described herein. For example, in some embodiments, cameras 206, 208 are omitted. In further embodiments, operator interface 204 is omitted.

Also, in the example embodiment, a first camera 206 is mounted to body assembly 114 and configured to provide information for driving motorized apparatus 102. For example, first camera 206 provides a live stream of the environment surrounding motorized apparatus 102. A second camera 208 is mounted to body assembly 114 adjacent maintenance device 112 and is configured to provide images of interior surface 108 (shown in FIG. 1) for use in performing a maintenance operation. First camera 206 and/or second camera 208 may be positionable relative to body assembly 114. In alternative embodiments, system 200 includes any camera 206, 208 that enables system 200 to operate as described herein.

In addition, in the example embodiment, controller 202 includes a transceiver 210, a processor 212, and a memory 214. In some embodiments, controller 202 is positioned remotely from motorized apparatus 102, e.g., controller 202 is located at a base station that enables an operator on an exterior of pipe 100 (shown in FIG. 1) to interact with motorized apparatus 102. Transceiver 210 is communicatively coupled with motorized apparatus 102 and is configured to send information to and receive information from a transceiver 216 of motorized apparatus 102. In some embodiments, transceiver 210 and transceiver 216 communicate wirelessly. In alternative embodiments, motorized apparatus 102 and controller 202 communicate in any manner that enables system 200 to operate as described herein. For example, in some embodiments, controller 202 and motorized apparatus 102 exchange information through a wired link extending between motorized apparatus 102 and controller 202.

In some embodiments, controller 202 includes a mapping interface configured to generate a map of interior cavity 104 of pipe 100 (shown in FIG. 1) around motorized apparatus 102 based on information received from maintenance device 112.

In addition, in the example embodiment, motorized apparatus 102 includes a processor 218 and a memory 220. Processor 218 is configured to execute instructions for controlling components of motorized apparatus 102, such as maintenance device 112 and drive systems 116. For example, processor 218 execute instructions that cause first wheel 122 and second wheel 124 to each rotate in directions that cause motorized apparatus 102 to move in a selected direction. For example, controller 202 determines positions of first wheel 122 and second wheels 124 and causes rotation of first wheel 122 and second wheel 124 to rotate in a manner that propels motorized apparatus 102 in an intended direction. In alternative embodiments, motorized apparatus 102 includes any processor 218 that enables system 200 to operate as described herein. In some embodiments, processor 218 is omitted.

In some embodiments, maintenance device 112 includes one or more sensors and/or repair tools or pipe maintenance tools. For example, in the example embodiment, maintenance device 112 includes a repair tool configured to repair interior surface 108 (shown in FIG. 1), or an inspection tool configured to inspect a portion of the interior cavity 104.

Also, in the example embodiment, operator interface 204 is configured to display information relating to the characteristics detected by motorized apparatus 102 for interpretation by the operator. Operator interface 204 may be included on a remote computing device (not shown) and/or may be incorporated with controller 202. Operator interface 204 may include, among other possibilities, a web browser and/or a client application. For example, in some embodiments, operator interface 204 displays images of interior surface 108 based on received signals. In some embodiments, operator interface 204 allows an operator to input and/or view information relating to control of motorized apparatus 102. In the example embodiment, operator interface 204 is configured to display information relating to the state of one or more of maintenance device 112 and a power source 222 for interpretation by the operator. For example, state information may include the position of motorized apparatus 102 along a length of pipe 100 (shown in FIG. 1). State information may also include a charge status of power source 222 and/or a current draw on the various drive and positioning motors. Processor 212 translates operator inputs into steering, tool motion, camera control, sensor control, sensor motion, and/or any other commands and sends information via transceiver 210 to motorized apparatus 102 via transceiver 216. In some embodiments, operator control of motorized apparatus 102 is in real time, such as through a joystick, keyboard, touchscreen, a remote motion capture system, and a wearable motion capture system or other interface having similar function. In other embodiments, motorized apparatus 102 is controlled partially or wholly according to a pre-programmed routine. In further embodiments, motorized apparatus 102 is at least partially automated. In some embodiments, an operator inputs information such as operation goals or conditional directions. In further embodiments, information, such as information received by controller 202 from motorized apparatus 102, control data sent to motorized apparatus 102, and additional operator inputs or state information (e.g., location, time, orientation, datalink quality, battery levels, repair material levels, failure mode indicators), is logged into memory 220 and/or memory 214.

Moreover, in the example embodiment, controller 202 is positioned on the exterior of pipe 100 (shown in FIG. 1) and communicates with motorized apparatus 102 positioned within interior cavity 104 (shown in FIG. 1) of pipe 100 (shown in FIG. 1). For example, controller 202 is configured to send information to motorized apparatus 102 relating to the propulsion and/or steering of motorized apparatus 102 while motorized apparatus 102 is moving within interior cavity 104 (shown in FIG. 1) of pipe 100 (shown in FIG. 1) through a wireless connection and/or a tether 224. In alternative embodiments, controller 202 and motorized apparatus 102 are configured in any manner that enables system 200 to operate as described herein.

Figure 7:
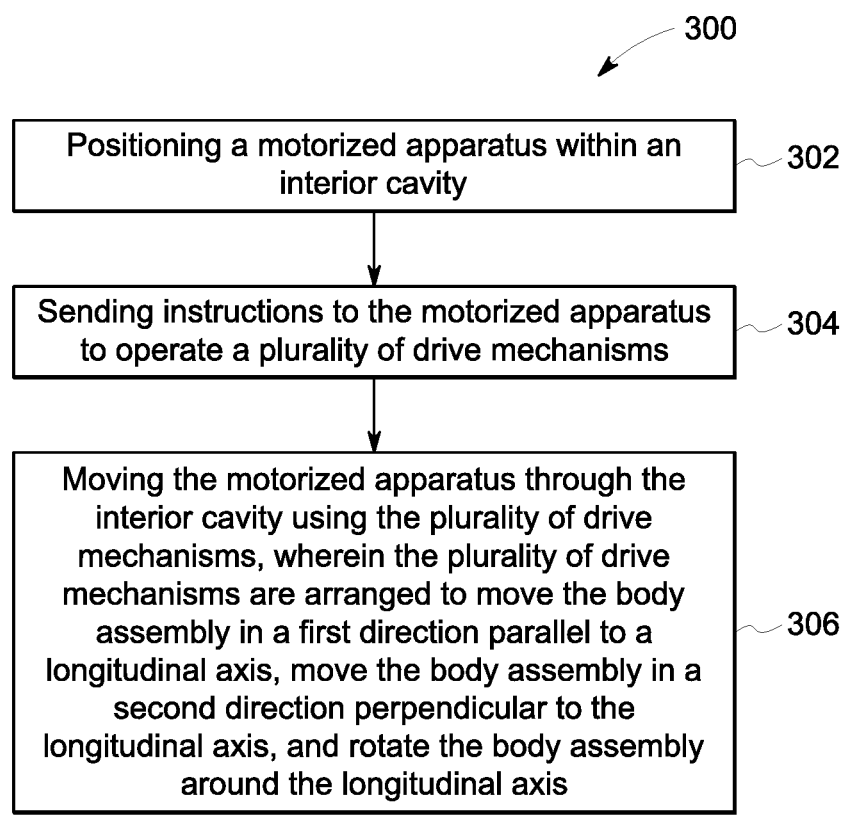
FIG. 7 is a flow chart of an example method of performing a maintenance operation using the motorized apparatus shown in FIG. 1.

FIG. 7 is a flow chart of an exemplary method 300 of performing a maintenance operation for pipe 100 (shown in FIG. 1) using motorized apparatus 102 (shown in FIG. 1). In reference to FIGS. 1-7, method 300 includes positioning 302 motorized apparatus 102 within interior cavity 104. In some embodiments, actuator assemblies 164 adjust the position of leg assemblies 120 relative to body assembly 114 such that leg assemblies 120 contact sidewall 106 and provide a predetermined force on sidewall 106.

In addition, method 300 includes sending 304 instructions to motorized apparatus 102 to operate a plurality of drive mechanisms. Also, method 300 includes moving 306 motorized apparatus 102 through interior cavity 104 using the plurality of drive mechanisms. For example, in some embodiments, motors of drive systems 116 are configured to drive wheels 122, 124, 126 to drive motorized apparatus 102 through interior cavity 104. Also, in the example embodiment, wheels 122, 124, 126 interact with surface 108 and propel motorized apparatus 102 in any selected direction. In particular, wheels 122, 124 are mecanum wheels and wheels 126 are omni-wheels. As a result, wheels 122, 124, 126 are able to move motorized apparatus 102 in a plurality of directions including directions parallel to longitudinal axis 118, perpendicular to longitudinal axis 118, parallel to transverse axis 119, and perpendicular to transverse axis 119. In addition, motorized apparatus 102 is able to rotate around longitudinal axis 118. Motorized apparatus 102 is configured to avoid any obstacles within pipe 100 because of the degrees of freedom of movement provided by drive systems 116. For example, motorized apparatus 102 may be rotated around longitudinal axis 118 using wheels 122, 124, 126 to avoid obstacles within pipe 100 and/or to position motorized apparatus 102 in a desired orientation. Wheels 122, 124, 126 facilitate motorized apparatus 102 being rotated to a precise position and provide complete control of the motion of motorized apparatus 102 as motorized apparatus 102 travels through interior cavity 104. The rotation of wheels 122, 124, 126 is stopped at the target location and, in some embodiments, motorized apparatus 102 parks by positioning leg assemblies 120 such that an increased force is provided on interior surface 108 from leg assemblies 120.

In some embodiments, motorized apparatus 102 detects characteristics of pipe 100 around motorized apparatus 102 when motorized apparatus 102 is parked within interior cavity 104. For example, in some embodiments, a map is generated of interior surface 108 around motorized apparatus 102 when motorized apparatus 102 is parked at a location along pipe 100. After the map is generated, motorized apparatus 102 is able to perform a maintenance operation on interior surface 108 based on information from the map. Accordingly, motorized apparatus 102 is able to operate even if sensors are unable to provide information during a maintenance operation.

Moreover, in some embodiments, method 300 includes performing at least one of a maintenance operation, an inspection operation, and a repair operation using maintenance device 112. In addition, in some embodiments, method 300 includes transmitting signals between motorized apparatus 102 and controller 202 through tether 224 coupled to motorized apparatus 102. Tether 224 extends from motorized apparatus 102 to an exterior of pipe 100. Accordingly, tether 224 allows motorized apparatus 102 to send and receive signals from controller 202 on an exterior of pipe 100. For example, in some embodiments, motorized apparatus 102 receives power via tether 224. In further embodiments, signals are transmitted through tether 224 with instructions for driving and operating motorized apparatus 102. Accordingly, tether 224 allows motorized apparatus 102 to have a compact size because components exterior of motorized apparatus 102 can communicate and provide signals to tether 224.

Figure 8:
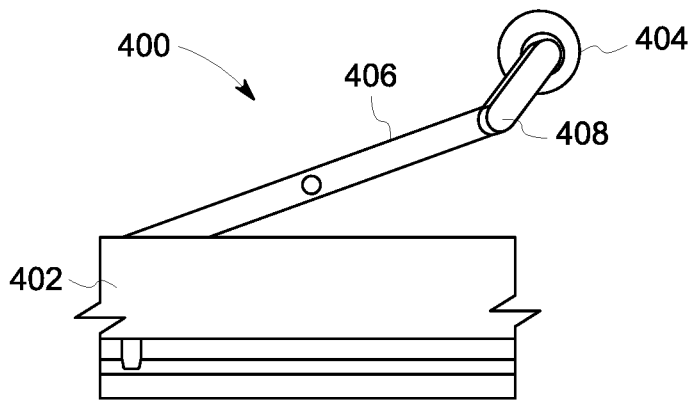
FIG. 8 is a side view of a portion of an alternative embodiment of a motorized apparatus for use with the system shown in FIG. 6, the motorized apparatus including a wheel in a first position.

FIG. 8 is a side view of a portion of an alternative embodiment of a motorized apparatus 400 for use with system 200 (shown in FIG. 6). Motorized apparatus 400 includes a body 402, at least one wheel 404, and at least one leg 406. In some embodiments, wheel 404 is used in conjunction with one or more mecanum wheels (e.g., wheels 122, 124 shown in FIGS. 3 and 4) and/or omni-wheels (e.g., wheel 126 shown in FIG. 5) to facilitate moving motorized apparatus 400 in different directions. In the example embodiment, wheel 404 is attached to body 402 by leg 406. Leg 406 includes a multi-directional joint 408 that facilitates wheel 404 pivoting at different angles relative to body 402.

Figure 9:
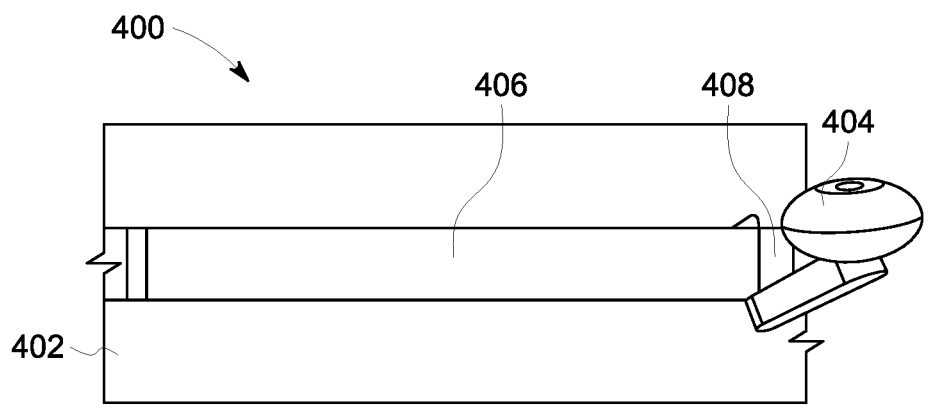
FIG. 9 is a top view of the motorized apparatus shown in FIG. 8, with the wheel in the first position.
Figure 10:
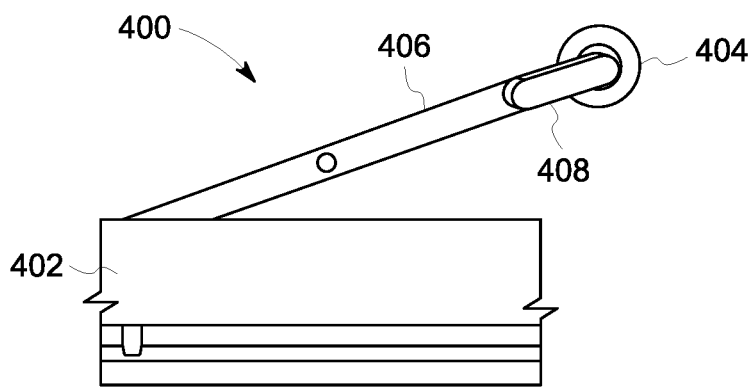
FIG. 10 is a side view of the motorized apparatus shown in FIGS. 8 and 9, with the wheel in a second position.
Figure 11:
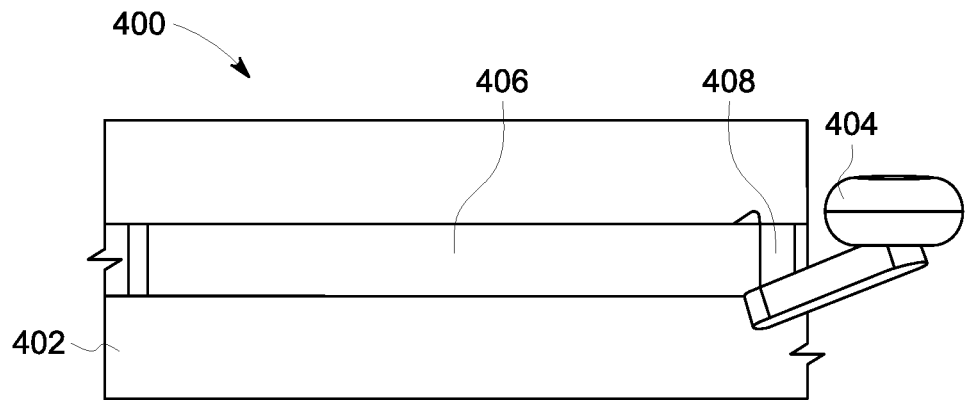
FIG. 11 is a top view of the motorized apparatus shown in FIGS. 8-10, with the wheel in the second position.
Figure 12:
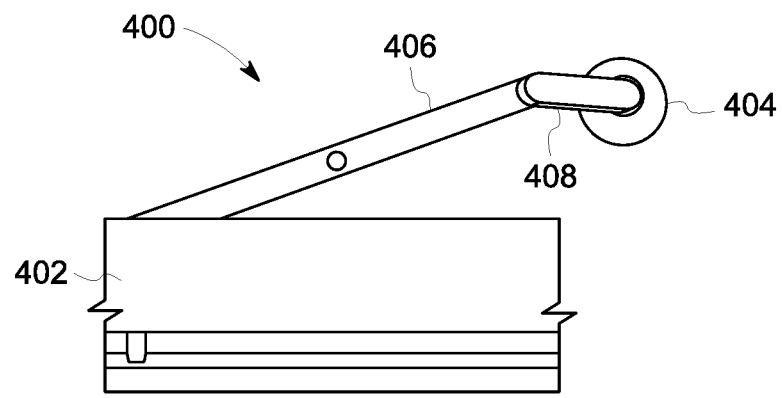
FIG. 12 is a side view of the motorized apparatus shown in FIGS. 8-11, with the wheel in a third position.
Figure 13:
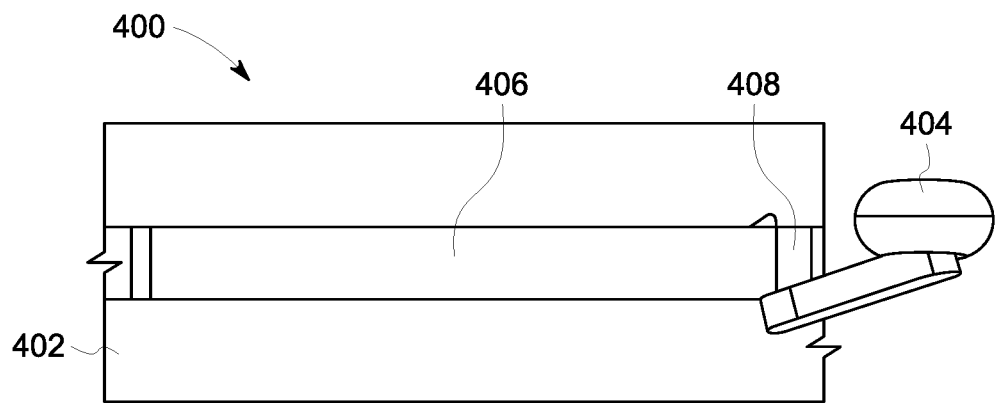
FIG. 13 is a top view of the motorized apparatus shown in FIGS. 8-12, with the wheel in the third position.

In the example embodiment, wheel 404 is positionable in a plurality of positions by pivoting multi-directional joint 408. For example, FIG. 9 is a top view of motorized apparatus 400 with wheel 404 in a first position. FIG. 10 is a side view of motorized apparatus 400 with wheel 404 in a second position. FIG. 11 is a top view of motorized apparatus 400 with wheel 404 in the second position. FIG. 12 is a side view of motorized apparatus 400 with wheel 404 in a third position. FIG. 13 is a top view of motorized apparatus 400 with wheel 404 in the third position. The different positions of wheel 404 facilitate motorized apparatus 400 moving in different directions when wheel 404 engages a surface. In some embodiments, an actuator is coupled to leg 406 to control the position of wheel 404. Also, in some embodiments, one or motors are coupled to leg 406 and/or wheel 404 to induce movement of leg 406 and/or rotation of wheel 404.

Figure 14:
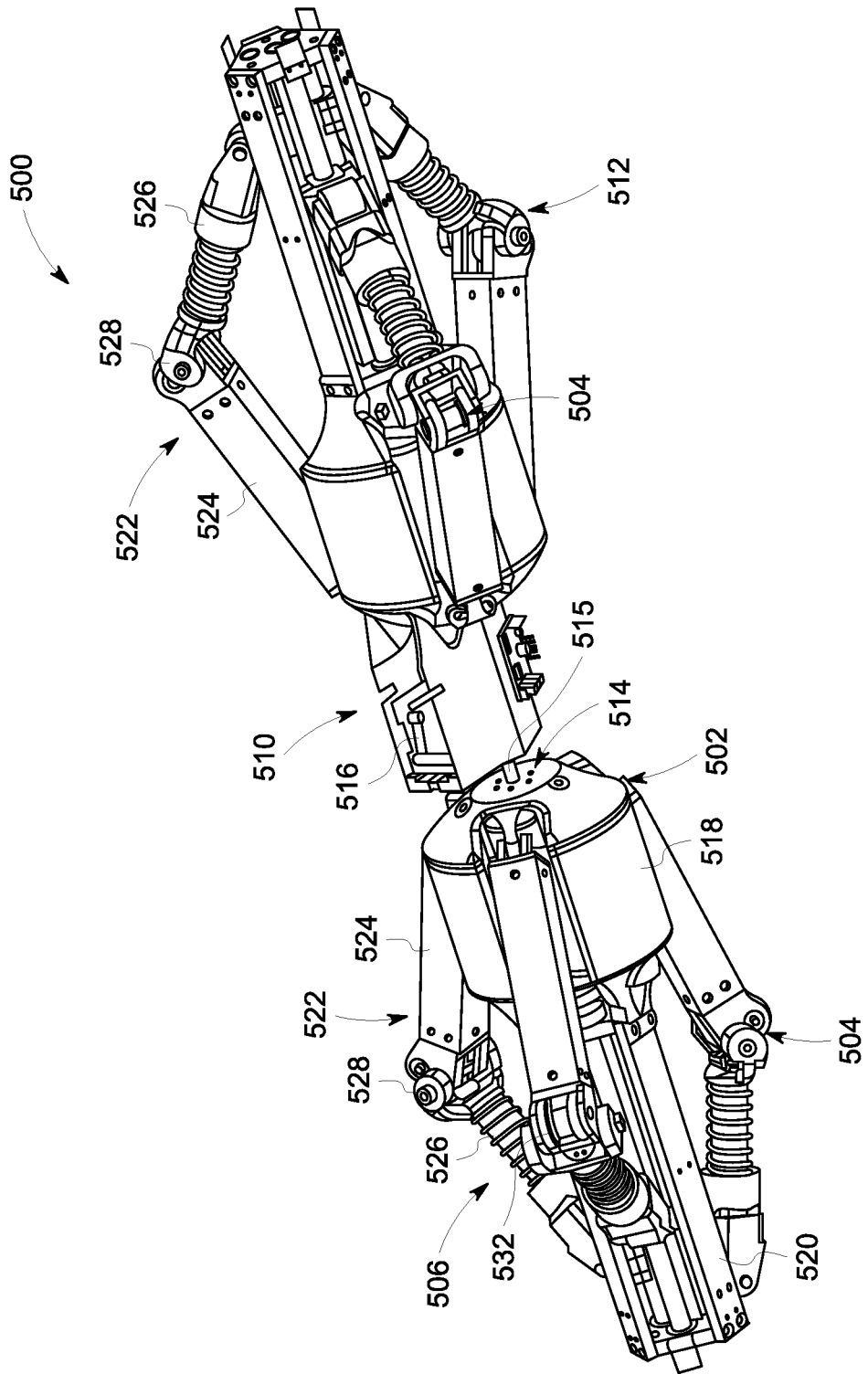
FIG. 14 is a perspective view of an alternative embodiment of a motorized apparatus for use with the system shown in FIG. 6, the motorized apparatus including an actuated joint portion.

FIG. 14 is a perspective view of an alternative embodiment of a motorized apparatus 500 for use with system 200 (shown in FIG. 6). Motorized apparatus 500 includes a body assembly 502 and at least one drive system 504. Also, in the example embodiment, body assembly 502 is modular and includes a plurality of portions that are detachably coupled together. Specifically, body assembly 502 includes a first drive portion 506, at least one actuated joint portion 510, and a second drive portion 512. In alternative embodiments, body assembly 502 includes any portions that enable motorized apparatus 500 to operate as described herein. For example, in some embodiments, motorized apparatus 500 includes a maintenance device portion incorporated into or coupled to actuated joint portion 510.

In the example embodiment, actuated joint portion 510 is coupled between first drive portion 506 and second drive portion 512. In the example embodiment, drive portions 506, 512 are identical and are able to couple to either end of actuated joint portion 510, a maintenance device portion, and/or to each other. Accordingly, drive portions 506, 512 are interchangeable and are able to be removed and, if necessary, replaced.

Also, in the example embodiment, actuated joint portion 510 includes a rotatable joint 514 coupled to at least one of first drive portion 506 and second drive portion 512 to facilitate movement of first drive portion 506 relative to second drive portion 512. For example, joint 514 comprises a bearing and a shaft 515 that is insertable in the bearing and is rotatable relative to the bearing. For example, the shaft may engage at least one surface beyond the bearing to couple the shaft axially within the bearing. In addition, the actuator joint portion 510 includes an actuator motor 516 that causes rotation of shaft 215 of rotatable joint 514 and therefore rotation of one of first drive portion 506 and second drive portion 512. In alternative embodiments, motorized apparatus 500 includes any actuated joint portion 510 that enables motorized apparatus 500 to operate as described herein.

Moreover, in the example embodiment, each drive portion 506, 512 includes a housing 518, a support 520, and a plurality of leg assemblies 522. Leg assemblies 522 each include a first leg portion 524 rotatably coupled to housing 518, and a second leg portion 526 moveably coupled to support 520. First leg portion 524 and second leg portion 526 are rotatably coupled together at a joint 528. Leg assemblies 522 are positioned circumferentially around support 520.

In addition, in the example embodiment, drive portions 506, 512 include drive systems 504 configured to propel motorized apparatus 500 through interior cavity 104 of pipe 100 (shown in FIG. 1). For example, drive mechanisms such as wheels 532 on each drive portion 506, 512 interact with sidewall 106 and are driven by one or more motors to propel motorized apparatus 500 along pipe 100. In the example embodiment, wheels 532 are coupled to joints 514 of leg assemblies 522. In the example embodiment, wheels 532 are arranged to facilitate driving of motorized apparatus 500 in multiple directions. In alternative embodiments, motorized apparatus 500 includes any drive systems 504 that enable motorized apparatus 500 to operate as described herein.

In the example embodiment, motorized apparatus 500 includes at least three leg assemblies 522 coupled to each drive portion 506, 512. Each leg assembly 522 is independently actuated and antagonistically positioned to maintain a constant contact force against the sidewall 106 (shown in FIG. 1). Motorized apparatus 500 is able to tilt and shift relative to the axis of pipe 100 (shown in FIG. 1) by controlling the position of leg assemblies 522. In alternative embodiments, motorized apparatus 500 includes any leg assemblies 522 that enable motorized apparatus 500 to operate as described herein.

In addition, in the example embodiment, actuated joint 510 facilitates motorized apparatus 500 rotating about the axis of pipe 100 because actuated joint 510 facilitates first drive portion 506 and second drive portion 512 rotating relative to each other and motorized apparatus 500 rotating about the axis. For example, one of first drive portion 506 or second drive portion 512 is parked, for example, by pressing leg assemblies 522 against sidewall 106 of pipe 100 to inhibit rotation of the respective drive portion 506, 512 about the axis. The other of first drive portion 506 or second drive portion 512 is free to move relative to the parked drive portion 506, 512. Actuated joint 510 is rotated using actuator motor 516 to cause the free, unparked drive portion 506, 512 to rotate about the axis of pipe 100. After rotation of drive portion 506, 512 to a desired position, the rotated drive portion 506, 512 can be parked and the previously parked drive portion 506, 512 can be rotated using actuated joint 510. In some embodiments, motorized apparatus 500 is rotated about the axis of pipe 100 in increments or steps until first drive portion 506 and/or second drive portion 512 reaches a desired position.

Embodiments described herein provide motorized apparatus and systems that useful for maintenance and inspection in a variety of applications. For example, some embodiments are used to maintain steam pipes and include a steam pipe weld repair system. In some embodiments, the steam pipe weld repair system is manually controlled. In further embodiments, the system is at least partly automated. Sensor data and operator inputs, including the selection and rejection of regions to repair will be logged and used to refine algorithms to improve automated performance, reducing operator workload with use.

Embodiments of the motorized apparatus are able to move with protected sensing and maintenance equipment through steam pipes that can range from 6 to 36 inches in diameter with, for example, wall temperatures of 350° F. and an ambient atmosphere that is 250° F. with 100% relative humidity. The motorized apparatus adapts to variable pipe diameters using actuated leg assemblies. The actuated leg assemblies keep the motorized apparatus centered radially in the pipe. In addition, the motorized apparatus enables the maintenance device to undertake linear travel that is twice the diameter of the pipe.

In addition, in some embodiments, at least one driven wheel is used to contact the pipe's inner wall. In some embodiments, drive wheels include mecanum wheels, omni-wheels, and/or any other wheel. In some embodiments, the friction surface of each wheel is high temperature silicone, which has an operating temperature of over 550° F. and has desirable high friction and low thermal conductivity, which helps thermally isolate the motorized apparatus from the hot pipe's inner walls. Neodymium magnet motors may be used throughout the robotic motorized apparatus, including for the drive wheels, motion pod linkage actuators and maintenance device positioning system. Neodymium magnets have a Curie temperature of 589° F., allowing properly sized motors to perform well in relatively high temperature environments without additional cooling.

The arrangement of motion pods in the forward and aft positions of the robotic motorized apparatus allows the motorized apparatus to both push and pull itself through terrain such as expansion joints and diameter reducing couplings. Antagonistically positioned drive wheels allow the motorized apparatus to increase motorized apparatus traction as necessary by pressing harder against the inner wall of the pipe while driving, ensuring that the motorized apparatus can pull 500 feet worth of tether without increasing the weight of the motorized apparatus. The motorized apparatus utilizes actuator force, not motorized apparatus weight, to increase traction.

Because the maintenance device may rotate around an axial track and the direction of gravity relative to the motorized apparatus may be sensed and used to rotate sensor data, there is no preferred roll orientation for the motorized apparatus and therefore there is no need for complicated steering mechanisms on the motorized apparatus to re-orient the motorized apparatus as it traverses pipe sections.

The maintenance device carries sensors and tools required to perform buildup repairs when the motorized apparatus is stationary relative to the pipe and provides a fixed frame of reference for control. For example, in some embodiments, the maintenance device includes an ablation laser processing head for cleaning, a forming gas nozzle for controlling the atmosphere at the worksite, a laser processing head for cladding buildup repairs, a suction nozzle to continually remove debris as it is created, and an array of depth sensors. The full repair tool module of the maintenance device is mounted to a two degree of freedom motion platform that allows the tool to rotate around and two pipe diameters along the motorized apparatus robot's axial track. Distributing the repair tools radially around the module allows the motorized apparatus to position each tool relative to the work site by knowing the fixed angular offset between each tool and the depth scanning system. The individual inspection and repair tools are mounted a fixed distance away from the center of rotation so that the nominal working distance from each sensor or tool to the work piece may be maintained. The standoff distance can be manually adjusted to accommodate repairs to different pipe diameters.

In some embodiments, the motorized apparatus takes advantage of a gaseous cooling system to ensure electronics are maintained at operational temperatures. The cooling gas also serves as forming gas for the laser processing system and is dispensed through a nozzle to the repair site after circulating through specific regions of the robot's body and maintenance device to provide targeted cooling for electronics. In some embodiments, a metallic additive manufacturing process is used to provide a housing that protects consumer grade electronics in environments up to 700° F. using air cooling and up to 3000° F. using fluid (e.g., air or water) cooling.

A multi-function tether carries the cooling/forming gas to the motorized apparatus along with communications and power transmission. For example, in some embodiments, power is supplied for the maintenance device through two fiber optic cables and electrical power is transmitted through conductors inside of the tether. Welding wire will be fed through a dedicated channel and communications will be performed using standard Ethernet technologies. A vacuum channel will serve as a return path for collected debris allowing for longer operations than would be possible if debris were collected inside of the motorized apparatus. As a result, the tether allows the motorized apparatus to carry less components and have a reduced weight.

In further embodiments, the tether includes a casing having a low-friction, low-thermally conductive applique to reduce the conductive heating between the hot pipe wall and tether and lowering the pulling force required by the motorized apparatus to move the tether long distances. One example applique is a helical coil laced with ceramic beads that provides small surface area contact between the tether, low thermally conductive beads, and the inside of the pipe, reducing heat transfer from the pipe to the tether. In addition, the applique provides low friction rolling and sliding between the bearing beads and therefore the tether and the pipe wall. Wrapping the tether with a low-friction, low-thermal conductivity applique allows the motorized apparatus to operate over greater distances by reducing the conductive heating between the hot pipe wall and tether and lowering the pulling force required by the motorized apparatus to move the tether.

In some embodiments, the motorized apparatus is equipped with two types of sensors: visual sensors and depth sensors. A situational awareness camera will be mounted inside a cooled chamber of an aft motion housing, looking in the axially forward direction. From this position, this sensor will allow the operator to visualize the pipe section that the maintenance device has access to as well as to monitor the motions of the maintenance device during a repair operation. In at least some embodiments, it will be known how far into the pipe the repair site is located before the motorized apparatus enters a pipe to perform repairs. The operator can then drive the motorized apparatus quickly to a distance that is just short of the expected repair site, estimating distance by dispensed tether length, and then drive forward slowly while watching the feed from this situational awareness camera to park the motorized apparatus so that the repair site is within the field of regard of the maintenance tool.

In some embodiments, the maintenance device carries an array of depth sensors that are housed in cooled cavities. By rotating around and traversing along the axis of the axial track, the array of depth sensors will collect a complete point cloud model of the inside surface of the pipe in coordinates that are fixed to the robot, which is stationary relative to the pipe. This fixed coordinate system, tied through the motorized apparatus to the pipe, allows the motorized apparatus to know its surroundings blindly, making the motorized apparatus robust to challenges such as fogged over lenses. In some embodiments, a process monitoring visual camera is mounted to the laser processing head to allow for visual feedback. Optical windows in front of each camera may be equipped with heaters to minimize fogging. Inertial measurement units mounted inside of cooled housings that are rigidly oriented relative to all sensors will allow the motorized apparatus to measure the direction of gravity and therefore establish the orientation of collected data. Once a comprehensive set of depth data has been collected over the field of regard of the maintenance device, the point cloud may be processed into a surface model using a tessellation algorithm. In parallel, a cylindrical surface may be fit to the point cloud with greater weight applied during the fit to points farthest away from the pipe's bottom dead center. Comparing the tessellated, as measured surface model, to the idealized cylindrical surface model, the system will calculate a volumetric region for cladding buildup in fixed robot coordinates. The model may be analyzed and automatically tapered at the forward and aft boundaries of the maintenance tool's field of regard to ensure that smooth transitions between the original pipe and built up regions are realized. Additionally, the model facilitates a taper between repairs if the motorized apparatus must be moved to address long repair sites.

In some embodiments, laser cleaning and welding of pipes creates high strength repairs. Dispensing forming gas and suctioning debris during cleaning (center frame) removes debris as the repair site is both cleaned and repairs are made. In further embodiments, the motorized apparatus utilizes laser ablation to clean the repair site. For example, some laser ablation systems include a nanosecond scale pulsed laser and a galvanometer scanner to steer the ablating laser beam. The laser ablation system are sized to be incorporated into the maintenance device. In some embodiments, some components of the laser ablation system are located remote from the motorized apparatus such as at a base station of the motorized apparatus.

Following the completion of a cladding repair, the scanning and mapping systems may collect and produce another depth map of the repair site and the laser ablation system may be used to perform any final cleanup if necessary.

In some embodiments, motorized apparatus 102 is used to perform a maintenance operation for pipe 100, such as a repair of interior surface 108. An example repair sequence includes the following steps:

1. Recognize a need for maintenance over a given stretch of pipe using an independent inspection approach and distance to the repair site from the access port.
2. Prepare an access port by opening the access point and ensuring that the pipe walls are no warmer than 350° F.
3. Maintenance system (Motorized apparatus and base station) are delivered to access site.
4. Motorized apparatus is powered up, consumables are loaded, and system readiness checks are performed.
5. Motorized apparatus is inserted into the prepared access port.
6. Motorized apparatus is commanded to travel a distance that is just shy of the expected repair site.
7. Inspection system configured to scan pipe walls while motorized apparatus drives into pipe with intention of locating pre-identified areas in need of repair.
8. When an area in need of repair is located, motorized apparatus position is tuned to ensure region in need of repair falls within the field of regard of the repair tool
9. Operator verifies motorized apparatus position relative to repair area by looking at sensor data displayed on base station.
10. Motorized apparatus parks at the selected location relative to the pipe and region in need of repair.
11. Inspection system performs a detailed scan (including depth) of the workspace, with sensed information traceable back to the location of the motorized apparatus relative to the pipe.
12. Operator reviews workspace scan and selects/confirms regions for surface preparation.
13. Repair tool is driven relative to the motorized apparatus-based frame of reference to prepare selected regions for buildup repair.
14. Laser ablation system cleans surface to be repaired while debris management system removes loosened material.
15. Inspection system performs detailed scan (including depth) of prepared surfaces.
16. Operator selects/confirms locations of specific sites to perform repairs (all relative to motorized apparatus's frame of reference which is firmly fixed to the pipe because the motorized apparatus is parked)

17. Toolpath generated for repair tool to perform buildup repair based on captured 3D model and operator inputs.
18. Operator reviews toolpath and accepts or returns to step 15 for refinement.
19. Repair tool follows toolpath. It is possible to perform the operation with little or no visual feedback because tool is controlled relative to the motorized apparatus's frame of reference and that is fixed to the pipe.
20. Inspection system performs detailed scan (including depth) of built-up surfaces.
21. System analyzes generated 3D map and generates recommendation for rework or repair completion.
22. Operator reviews system recommendation and returns to step 16 or proceeds.
23. Cleaning tool performs final cleanup of entire reachable area.
24. If more repairs are needed, return to step 6, otherwise, motorized apparatus backs out of pipe, maintenance system is removed, and pipe is returned to service.

An example technical effect of the methods, systems, and apparatus described herein includes at least one of: (a) reducing the time to inspect and/or repair pipes; (b) enabling inspection and repair of an interior cavity of a pipe at greater distances from an access opening; (c) increasing the information that is available during a maintenance operation of an interior cavity of a pipe; (d) providing an apparatus configured to withstand relatively high temperatures and pressures within a pipe; (e) providing an apparatus that is configured to fit within a range of pipe sizes and traverse different transitions; (f) providing precise positioning of a maintenance device within a pipe; and (g) increasing the degrees of freedom of movement of an apparatus within a pipe.

Example embodiments of systems and methods for use in maintaining pipes are described above in detail. The methods and systems are not limited to the specific embodiments described herein, but rather, components of systems and/or steps of the methods may be utilized independently and separately from other components and/or steps described herein. For example, the method may also be used in combination with other components, and are not limited to practice only with the pipes as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motorized apparatus for use in maintaining a pipe having a sidewall defining an interior cavity, said motorized apparatus comprising:
a body assembly extending along a longitudinal axis;
at least one maintenance device coupled to said body assembly;
a plurality of leg assemblies coupled circumferentially around said body assembly; and
a plurality of drive mechanisms coupled to said plurality of leg assemblies, wherein said plurality of drive mechanisms are configured to interact with the sidewall, said plurality of drive mechanisms comprising at least two wheels, wherein said plurality of drive mechanisms are arranged to move said body assembly in a first direction parallel to the longitudinal axis, move said body assembly in a second direction perpendicular to the longitudinal axis, and rotate said body assembly around the longitudinal axis, wherein each of said at least two wheels is a mecanum wheel.

2. The motorized apparatus in accordance with claim 1 further comprising at least one motor coupled to said at least two wheels and configured to cause rotation of said at least two wheels.

3. The motorized apparatus in accordance with claim 2, wherein said plurality of drive mechanisms further comprises at least one omni-wheel that is not rotated by said at least one motor.

4. The motorized apparatus in accordance with claim 1, wherein at least one leg assembly of said plurality of leg assemblies includes a joint to facilitate pivoting of at least one drive mechanism of said plurality of drive mechanisms between a plurality of positions.

5. The motorized apparatus in accordance with claim 1, wherein said body assembly comprises a first drive portion and a second drive portion, and wherein said plurality of leg assemblies comprise three leg assemblies coupled to said first drive portion and three leg assemblies coupled to said second drive portion.

6. The motorized apparatus in accordance with claim 1, wherein said plurality of leg assemblies comprise a first leg assembly, a second leg assembly, and a third leg assembly, and wherein said at least two wheels comprise a first mecanum wheel coupled to said first leg assembly and a second mecanum wheel coupled to said second leg assembly, said plurality of drive mechanisms further comprising at least one omni-wheel coupled to said third leg assembly.

7. The motorized apparatus in accordance with claim 1, wherein each leg assembly of said plurality of leg assemblies comprises a first leg portion, a second leg portion, and a joint pivotably coupling said first leg portion to said second leg portion, and wherein each drive mechanism of said plurality of drive mechanisms is coupled to said joint of a corresponding leg assembly of said plurality of leg assemblies.

8. The motorized apparatus in accordance with claim 1 further comprising at least one actuator assembly coupled to said plurality of leg assemblies and configured to actuate said plurality of leg assemblies and control a force of said drive mechanisms against the sidewall.

9. The motorized apparatus in accordance with claim 1, wherein each of said at least two wheels comprises a plurality of passively controlled components and is transitionable between a plurality of positions.

10. The motorized apparatus in accordance with claim 1 further comprising a controller communicatively coupled to said motorized apparatus, said controller configured to send instructions to operate said plurality of drive mechanisms and said at least one maintenance device.

11. The motorized apparatus in accordance with claim 10 further comprising at least one motor coupled to said drive mechanisms and configured to cause rotation of said at least two wheels, said controller configured to send instructions to said motor to control movement of said at least two wheels.

12. A method for maintaining a pipe having a sidewall defining an interior cavity, said method comprising:
- positioning a motorized apparatus within the interior cavity, the motorized apparatus including:
  - a body assembly extending along a longitudinal axis;
  - at least one maintenance device coupled to the body assembly;
  - a plurality of leg assemblies coupled circumferentially around the body assembly; and
  - a plurality of drive mechanisms coupled to the plurality of leg assemblies, wherein the plurality of drive mechanisms are configured to interact with the sidewall, the plurality of drive mechanisms including at least two wheels;
- sending instructions to the motorized apparatus to operate the plurality of drive mechanisms;
- moving the motorized apparatus through the interior cavity using the plurality of drive mechanisms, wherein the plurality of drive mechanisms are arranged to move the body assembly in a first direction parallel to the longitudinal axis, move the body assembly in a second direction perpendicular to the longitudinal axis, and rotate the body assembly around the longitudinal axis; and
- transitioning at least one of the at least two wheels between a plurality of positions, wherein each of the at least two wheels is a mecanum wheel.

13. The method in accordance with claim 12, wherein sending instructions to the motorized apparatus to operate the plurality of drive mechanisms comprises sending instructions to at least one motor of the motorized apparatus coupled to the plurality of drive mechanisms and configured to cause rotation of the at least two wheels.

14. The method in accordance with claim 12 further comprising actuating at least one leg of the plurality of leg assemblies using at least one actuator assembly coupled to the plurality of leg assemblies, the at least one actuator assembly configured to control a force of the plurality of drive mechanisms on the sidewall.

15. The method in accordance with claim 12 further comprising transitioning each of the at least two wheels between a plurality of positions, wherein each of the at least two wheels includes a plurality of passively controlled components.

16. A motorized apparatus for use in maintaining a pipe having a sidewall defining an interior cavity, said motorized apparatus comprising:
- a body assembly extending along a longitudinal axis;
- at least one maintenance device coupled to said body assembly;
- a plurality of leg assemblies coupled circumferentially around said body assembly;
- a plurality of drive mechanisms coupled to said plurality of leg assemblies, wherein said plurality of drive mechanisms are configured to interact with the sidewall, said plurality of drive mechanisms comprising at least two wheels, wherein said plurality of drive mechanisms are arranged to move said body assembly in a first direction parallel to the longitudinal axis, move said body assembly in a second direction perpendicular to the longitudinal axis, and rotate said body assembly around the longitudinal axis, wherein at least one leg assembly of said plurality of leg assemblies includes a joint to facilitate pivoting of at least one drive mechanism of said plurality of drive mechanisms between a plurality of positions; and
- at least one actuator coupled to said at least one leg assembly of said plurality of leg assemblies and configured to actuate said at least one leg assembly to adjust a position of said at least one drive mechanism of said plurality of drive mechanisms.

17. The motorized apparatus in accordance with claim 16 further comprising at least one motor coupled to said at least two wheels and configured to cause rotation of said at least two wheels.

18. The motorized apparatus in accordance with claim 17, wherein said at least two wheels are mecanum wheels, and wherein said plurality of drive mechanisms further comprises at least one omni-wheel that is not rotated by said at least one motor.

19. The motorized apparatus in accordance with claim 16, wherein said at least one leg assembly of said plurality of leg assemblies comprises a first leg portion and a second leg portion, said joint pivotably coupling said first leg portion to said second leg portion, and wherein said at least one drive mechanism of said plurality of drive mechanisms is coupled to said joint.

20. The motorized apparatus in accordance with claim 16, wherein each of said at least two wheels is a mecanum wheel comprising a plurality of passively controlled components and is transitionable between a plurality of positions.

* * * * *

UNITED STATES PATENT AND TRADEMARK OFFICE
CERTIFICATE OF CORRECTION

| | | |
|---|---|---|
| PATENT NO. | : 11,867,339 B2 | Page 1 of 1 |
| APPLICATION NO. | : 17/590628 | |
| DATED | : January 9, 2024 | |
| INVENTOR(S) | : Todd William Danko and Alexander Kyle Duncan | |

It is certified that error appears in the above-identified patent and that said Letters Patent is hereby corrected as shown below:

In the Specification

Column 1, before the heading BACKGROUND, please insert:
-- STATEMENT REGARDING FEDERALLY SPONSORED RESEARCH OR DEVELOPMENT
This invention was made with Government support under DE-AR0001328 awarded by DOE, Office of ARPA-E. The Government has certain rights in this invention. --

Signed and Sealed this
Fifth Day of August, 2025

Coke Morgan Stewart
*Acting Director of the United States Patent and Trademark Office*